United States Patent Office 3,179,649
Patented Apr. 20, 1965

3,179,649
POLYMERIZATION CATALYST MIXTURE OF A BISMUTHINE, A CUPROUS SALT, AND A LEWIS ACID
Darrell C. Feay, Berkeley, James C. Mackey, Concord, and Joseph B. Byrne, Antioch, Calif., assignors to The Dow Chemical Company, Midland, Mich., a corporation of Delaware
No Drawing. Filed Dec. 11, 1961, Ser. No. 158,548
8 Claims. (Cl. 260—94.9)

This invention relates to a new catalyst composition for initiating and promoting polymerization of ethylenically unsaturated monomers. It particularly concerns a new catalytically active mixture of a bismuthine, a cuprous salt, and a Lewis acid.

It is known from Belgian Patents 533,362 and 538,782 to polymerize ethylene and higher olefins with catalytically active mixtures of a compound of a transition metal from Groups IV, V, and VI of the Periodic Arrangement of the Elements, i.e. titanium, zirconium, hafnium, vanadium, nobium, tantalum, chromium, molybdenum, tungsten, thorium, and uranium, such as titanium tetrachloride, and an organoaluminum compound such as triethylaluminum.

It is also known from British patent specification 827,229 to polymerize ethylene by bringing it into contact with the product obtained by treating a copper or silver compound in a hydrocarbon medium with aluminum hydride or an organoaluminum compound, trialkylaluminum being preferred.

Catalysts of such kind, although perhaps catalytically active, are disadvantageous in use because the organoaluminum compounds are hazardous in that they are generally incendiary and corrosive to human flesh and are unstable in that they are easily deteriorated by moisture, air, carbon dioxide, and many other commonly encountered impurities.

It is, therefore, an object of this invention to provide an improved and novel catalyst useful in polymerization of ethylenically unsaturated monomers.

It is a further object to provide a process for producing high molecular weight solid polymers from ethylenically unsaturated monomers.

This invention resides in the finding of a particular advantageous catalyst system that is beneficial in polymerizing a mono- or poly-ethylenically unsaturated monomer, which catalyst system comprises (1) at least one organo bismuth or bismuthine compound of the formula $R_3Bi$, wherein each R is a monovalent hydrocarbon radical independently selected from the group of alkyl, cycloalkyl and aryl radicals; (2) at least one cuprous salt of the type $Cu_2X_2$ (alternatively given the empirical formula CuX) wherein X is a monovalent radical capable of forming a salt with cuprous copper; and (3) aluminum tribromide ($AlBr_3$).

The particular improvement provided by and inherent in the catalyst system of the invention comes through the relative ease of handling the components that make up the catalyst in addition to the ability to employ lower temperatures and pressures than are necessary with some of the prior known catalysts. For instance, with the instant catalyst, room temperature and atmospheric pressure may be entirely satisfactory in a particular polymerization. In this respect, it is significant in the understanding of the invention to know that no combination of any two of the three components of the catalyst of the invention is active as a polymerization promoter at room temperature.

The bismuthine compounds of the formula $R_3Bi$ employed in the invention are of the type wherein each of the hydrocarbon radicals R is a 1 to 20, and advantageously 1 to 10, carbon atom alkyl, cycloalkyl or aromatic radical; in a given bismuthine compound the radicals may be the same or different. Exemplary of these radicals are methyl, ethyl, isopropyl, hexyl, octadecyl, cyclohexyl, phenyl, benzyl, tolyl, etc. One or a mixture of two or more bismuthine compounds may be used.

The cuprous salt that is admixed with one of the bismuthines described above is preferably an anhydrous salt or a mixture of two or more of such salts. Preferably, cuprous halides, and advantageously cuprous chloride, is utilized in the present 3-component catalyst system. Other salts are suitable, however, for example, cuprous bromide, cuprous iodide, and cuprous cyanide. Frequently, better results are obtained if the cuprous salt is of the type having a high surface area which may be prepared by known methods. It is significant to note that inferior results, often leading to inoperability, are obtained when cupric salts are utilized in place of the cuprous salts in accordance with the invention.

As indicated, the third component in the catalyst system is aluminum tribromide. In this connection, the fact that other aluminum halides or organo aluminum halides cannot be substituted for the $AlBr_3$ without incurring inferior or inoperable results is of particular interest in regard to the instant catalyst.

As a preferred embodiment of the invention, the combination of triphenyl bismuth ($(C_6H_5)_3Bi$), cuprous chloride ($Cu_2Cl_2$), and aluminum tribromide ($AlBr_3$) is utilized in the catalyst system.

The catalyst compositions of this invention are those which comprise at least appreciable proportions of each of the bismuthine compound, the cuprous salt, and the aluminum tribromide.

Ordinarily, and preferably, about equimolar quantities of the bismuthine and the cuprous salt are employed in the catalyst system with the molar quantity of the aluminum tribromide being about 4 times that of either the bismuthine or the cuprous salt. However, the molar ratio of bismuthine to cuprous salt can conveniently range from about 1:1 to about 10:1 while the molar ratio of the aluminum tribromide to cuprous salt conveniently ranges from about 1:1 to about 10:1.

Depending somewhat on the monomer(s) being polymerized, generally only a small amount of catalyst is necessary to assure the activating effect. On the order of 0.1 to 10 and preferably 0.1 to 5 weight percent of catalyst based on the weight of the polymerizing monomer is conveniently employed in the practice of the invention.

The monomers that are beneficially polymerized with the catalysts of the invention are broadly defined as ethylenically unsaturated monomers, including both mono- and poly-ethylenically unsaturated monomers. Those monomers of the aliphatic and cyclic olefin class containing 2 to 8 carbon atoms, including both mono- and di-olefins, such as ethylene, propylene, butylene, and butadiene (including polymerizable mixtures thereof) and particularly 1-olefins or α-olefins, which are so-designated because of their terminal unsaturation, are beneficially polymerized in accordance with the invention. Examples of other polymerizable monomers that can be polymerized in accordance with the invention are the aryl olefins, particularly styrene and alkyl-substituted styrenes such as methyl styrene. Other monomers that may be polymerized by and are exemplary of the versatility of the present catalysts are vinyl chloride, acrylonitrile, methyl acrylate, etc.

The polymerizations carried out with the present catalysts are preferably performed in the presence of an anhydrous inert hydrocarbon solvent (or gas) under pressure sufficient to maintain a liquid phase during the polymerization. In this manner, a mixed phase is usually prevalent since the catalyst is usually dispersed slurry-like throughout the solvent. Care should be taken that the solvent is free of oxygen- and sulfur-containing compounds which tend to deactivate the catalyst. Among the hydrocarbon solvents or diluents that can be used in the polymerization process with the instant catalysts are the alkanes such as propane, butane, pentane, isooctane, etc.; the cycloalkanes such as cyclohexane; and the aromatics such as benzene, toluene and xylene. The exact choice of the diluent will, of course, depend on the particular species of catalyst, the monomer(s) being polymerized and the particular operating conditions.

As indicated, the instant catalysts can suitably enhance polymerization at room temperature and atmospheric pressure. However, increasing the temperature or the pressure generally provides an increase rate of polymerization. Temperatures from about room temperature and below up to about 250° C. and higher can be employed. The preferred range is from about 20° to 80° C. Similarly, a rather broad range of pressure may be employed for the polymerization. For example, from atmospheric pressure and below up to any feasibly attainable pressure, e.g., 25,000 p.s.i. can be beneficially adapted. A more desirable range is from atmospheric to 100 p.s.i. or so. Again, the particular operating conditions will be in part determined by the catalyst-monomer system.

When the catalysts of the present invention are utilized, generally either the cuprous salt or the bismuthine component of the catalyst is first dissolved or dispersed in a desired solvent after which the other component is added. The $AlBr_3$ is usually, but not necessarily, added last. Preferably the first two catalyst components, in the solvent, are added to the polymerization reactor after which the monomer to be polymerized is added and then the $AlBr_3$ is added to complete the catalyst composition and to initiate the polymerization. Other procedures are also satisfactory, such as adding the $AlBr_3$ to the reactor containing the other two components and then pressuring the reactor with the polymerizable monomer. In any event, care should be taken to flush the reactor, and keep it free, of impurities that tend to deactivate the catalyst, as indicated, the primary offenders being oxygen- and sulfur-containing compounds, including water.

After the termination of polymerization, or when and if it is desired to stop the polymerization, the catalyst is deactivated by quenching with, for instance, alcohol or acetone, killing the reaction. The polymer is then recovered from the mixture by known means such as filtration and the catalyst is removed from the polymer by known methods.

The following examples are given to illustrate the invention; all parts and percentages are by weight unless otherwise specified.

*Example 1*

A catalyst composition was prepared by charging to a steel pressure reactor which had been purged with nitrogen 1 liter of xylene containing 4.40 grams of triphenyl bismuth (($C_6H_5$)$_3$Bi), 1.0 gram of $Cu_2Cl_2$, and 10.7 grams of $AlBr_3$. The $Cu_2Cl_2$ was one having a high surface area. The reactor was then first purged with ethylene and then pressured with ethylene to 50 p.s.i.g. The ethylene was polymerized for six hours at 23°–35° C. after which the polymerization was stopped by adding acetone to the reactor. The polymer was removed from the reactor, filtered, washed with acetone and HCl, and finally acetone rinsed. After drying, 36 grams of polymer as a white powder was obtained.

The resulting polyethylene had the following solution viscosities: reduced viscosity 4.85, and inherent viscosity 4.63 (0.02 g. polymer/100 ml. decahydronaphthalene at 135° C.); a viscosity average molecular weight of 170,000; and was 88 percent crystalline as determined by X-ray diffraction methods. The polymer melted between 133° and 136° C. and could be flash molded into a film. Infrared data obtained from the film indicated no branching nor unsaturation in the polymer, i.e., the polymer was essentially polymethylene. A film so-produced from the polymer had the following physical properties: tensile at yield, 3400 p.s.i.; tensile at break, 5000 p.s.i.; elongation at break, up to 600 percent.

*Example 2*

Following the procedure of Example 1 except for the use of a catalyst composition comprising a commercial grade of $Cu_2Cl_2$ in place of the high surface $Cu_2Cl_2$ of Example 1 and the use of cyclohexane in place of toluene, a polymerization temperature of 60° C. and a polymerization time of 4–5 hours, 12 grams of polyethylene was obtained. The polymer had a molecular weight in excess of 750,000 and was insoluble in decahydronaphthalene at 135° C.

*Example 3*

Following the same general procedure of Example 1, a polymer of polyethylene was produced wherein the catalyst system employed was composed of 10 mM. (milligrammoles) of ($C_6H_5$)$_3$Bi, 5 mM. of $Cu_2I_2$ and 40 mM. of $AlBr_3$. The polymerization was allowed to run four hours. Three grams of polyethylene was obtained having the following physical properties determined as in Example 1: (0.04 g. polyethylene/100 ml. decahydronaphthalene at 135° C.), reduced viscosity 2.70, inherent viscosity 2.56; nominal molecular weight about 86,000; 78 percent crystallinity; and melting range of 118–121° C.

*Example 4*

When, for the purpose of contrast with this invention, the procedure of Example 1 was repeated using $AlCl_3$ in place of $AlBr_3$, a polymerization temperature of 60° C., and polymerization time of 3 hours, only 0.2 gram of polymer was obtained.

*Example 5*

One millimole of ($C_6H_5$)$_3$Bi, was dissolved in 10 ml. of toluene which was warmed to make a solution. One-half millimole of $Cu_2Cl_2$ having a high surface area was added to the solution which was then transferred to a glass reactor containing 90 ml. of n-heptane at room temperature and under one atmosphere of ethylene. Four millimoles of $AlBr_3$ were added to the reactor to form a catalytically active composition with the triphenylbismuth and the cuprous chloride and the ethylene was allowed to polymerize for 18 hours before the catalyst slurry was deactivated with methanol. The deactivated catalyst was filtered off. Polyethylene in amount of 2.6 grams was recovered, washed with acetone, dilute aqueous HCl and again with acetone, and finally dried to a white hard wax-like product. In a duplicate run, 1.2 grams of the same type polyethylene was obtained in four hours.

*Example 6*

A catalyst system of 5 mM. of ($C_6H_5$)$_3$Bi, 5 mM. $Cu_2Br_2$ and 20 mM. $AlBr_3$ in 0.5 liter of n-heptane was employed for the polymerization of ethylene in accordance with the general procedure of Example 5. The polymerization was run for about 20 hours at 23–40° C. The resulting polymer had a molecular weight in excess of 750,000 and was insoluble in decahydronaphthalene at 135° C.

*Example 7*

In contrast to Examples 5 and 6, and to further point out the criticalities of the present invention, when attempts were made to polymerize ethylene following the procedure of Example 1 and using the following mixed compositions, either no polymer was formed or only a trace amount of polymer was formed, and in the latter instance, only inferior low molecular weight material was obtained:

| Bismuthine | Metal Salt | Lewis Acid |
| --- | --- | --- |
| $(C_6H_5)_3Bi$ | $FeCl_2$ | $AlBr_3$ |
| $(C_6H_5)_3Bi$ | $Cu_2Cl_2$ | $(C_2H_5)AlCl_2$ |
| $(C_6H_5)_3Bi$ | $CuCl_2$ | $AlBr_3$ |
| $(C_6H_5)_3Bi$ | None | $AlBr_3$ |
| $(C_6H_5)_3Bi$ | $Cu_2Cl_2$ | none |
| None | $Cu_2Cl_2$ | $AlBr_3$ |

*Example 8*

Two millimoles of $Cu_2Cl_2$ were added to 100 ml. of n-heptane in a glass reactor that had been purged with nitrogen. Then 4 mM. of $(C_6H_5)_3Bi$ was added to the reactor and the reactor was evacuated and pressured to about 1 p.s.i.g. with 1,3-butadiene. Sixteen mM. of $AlBr_3$ as a 1 M solution in cyclohexane was then added to form a catalytically active composition with the $Cu_2Cl_2$ and the $(C_6H_5)_3Bi$. Polymerization of the butadiene was allowed to proceed for 20 hours before it was stopped by quenching with methanol. The polymer was recovered and washed with cold methanolic-HCl, then methanol and subsequently vacuum dried at room temperature. About 5.9 grams of polymer was obtained. The polymer was amorphous as determined by X-ray diffraction techniques and was identified as a 50–50 mixture of trans-1,4-polybutadiene and 1,2-polybutadiene by infrared spectra.

Similar excellent results to those described hereinbefore are obtained when other bismuthines and/or other cuprous salts are employed in accordance with the invention.

What is claimed is:

1. A catalyst composition consisting essentially of (1) a bismuthine compound of the formula $R_3Bi$, wherein each R is a 1 to 20 carbon atom monovalent hydrocarbon radical independently selected from the group consisting of alkyl, cycloalkyl and aryl radicals; (2) a cuprous salt of the formula $Cu_2X_2$, wherein X is a monovalent radical capable of forming a salt with cuprous copper; and (3) aluminum tribromide, in proportionate amounts such that the molar ratio of the bismuthine compound to the cuprous salt is from about 1:1 to about 10:1 and the molar ratio of aluminum tribromide to the cuprous salt is from about 1:1 to about 10:1.

2. A catalyst composition according to claim 1 consisting essentially of triphenyl bismuth, cuprous chloride and aluminum tribromide.

3. A catalyst composition consisting essentially of (1) from about 10 to 30 mole percent of a bismuthine compound of the formula $R_3Bi$, wherein each R is a 1 to 20 carbon atom monovalent hydrocarbon radical independently selected from the group consisting of alkyl, cycloalkyl and aryl radicals; (2) from about 10 to 30 mole percent of a cuprous salt of the formula $Cu_2X_2$, wherein X is a monovalent radical capable of forming a salt with cuprous copper; and (3) from about 80 to 40 mole percent of aluminum tribromide.

4. A catalyst composition consisting essentially of from about 10 to 30 mole percent triphenyl bismuth, from about 10 to 30 mole percent cuprous chloride, and from about 80 to 40 mole percent aluminum tribromide.

5. A method for polymerizing an ethylenically unsaturated monomer by contacting said monomer with a catalyst consisting essentially of (1) a bismuthine compound of the formula $R_3Bi$, wherein each R is a 1 to 20 carbon atom monovalent hydrocarbon radical independently selected from the group consisting of alkyl, cycloalkyl and aryl radicals; (2) a cuprous salt of the formula $Cu_2X_2$, wherein X is a monovalent radical capable of forming a salt with cuprous copper; and (3) aluminum tribromide, in proportionate amounts such that the molar ratio of the bismuthine compound to the cuprous salt is from about 1:1 to about 10:1 and the molar ratio of aluminum tribromide to the cuprous salt is from about 1:1 to about 10:1.

6. The method of claim 5, wherein said catalyst consists essentially of triphenyl bismuth, cuprous chloride, and aluminum tribromide.

7. The method of claim 5, wherein said monomer in an α-ethylenically unsaturated monomer containing from 2 to 8 carbon atoms.

8. The method of claim 5, wherein said monomer is ethylene and said catalyst is 1 mole part triphenyl bismuth, 1 mole part cuprous chloride and 4 mole parts aluminum tribromide.

References Cited by the Examiner

UNITED STATES PATENTS 3,063,798  11/62  Langer et al. _____ 260—94.3

FOREIGN PATENTS 553,839  6/56  Belgium.
785,314  10/57  Great Britain.

JOSEPH L. SCHOFER, *Primary Examiner.*